(12) United States Patent
Blinick et al.

(10) Patent No.: US 7,669,050 B2
(45) Date of Patent: Feb. 23, 2010

(54) METHOD TO ENABLE USER MODE PROCESS TO OPERATE IN A PRIVILEGED EXECUTION MODE

(75) Inventors: Stephen L. Blinick, Tucson, AZ (US); Yu-Cheng Hsu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1285 days.

(21) Appl. No.: 10/877,910

(22) Filed: Jun. 24, 2004

(65) Prior Publication Data

US 2005/0289545 A1  Dec. 29, 2005

(51) Int. Cl.
H04L 29/06 (2006.01)
(52) U.S. Cl. .................. 713/166; 713/164; 713/165; 713/167
(58) Field of Classification Search .................. None
See application file for complete search history.

(56) References Cited

U.S. PATENT DOCUMENTS

| | | | | |
|---|---|---|---|---|
| 5,485,409 | A * | 1/1996 | Gupta et al. | 726/25 |
| 5,764,969 | A * | 6/1998 | Kahle et al. | 712/228 |
| 5,893,166 | A | 4/1999 | Frank et al. | |
| 6,226,725 | B1 | 5/2001 | Yarborough | |
| 6,772,332 | B1 * | 8/2004 | Boebert et al. | 713/153 |
| 7,120,794 | B2 * | 10/2006 | Kelley et al. | 713/164 |
| 7,124,302 | B2 * | 10/2006 | Ginter et al. | 713/189 |
| 7,383,587 | B2 * | 6/2008 | Watt et al. | 726/30 |
| 2002/0108028 | A1 | 8/2002 | Nunoe | |

OTHER PUBLICATIONS

Reinhardt, et al., "Kernel Support for the Wisconsin Wind Tunnel", pp. 1-17, Computer Sciences Department, University of Wisconsin, Sep. 1993.
Jain, et al., "User-Level Infrastructure for System Call Interposition: A Platform for Intrusion Detection and Confinement", pp. 1-20, Department of Computer Science, Iowa State University.
Barbieri, "[PATCH][RFC] x86 Multiple User-Mode Privilege Rings," LWN.net, posted Oct. 27, 2002.
Linux Lab Tutorial (http://labs.cs.utt.ro/labs/so2/html/nutt-intro.html.

* cited by examiner

Primary Examiner—Kambiz Zand
Assistant Examiner—Teshome Hailu
(74) Attorney, Agent, or Firm—Dale F. Regelman; Quarles & Brady LLP

(57) ABSTRACT

A method to enable a user mode process to operate in a privileged execution mode is disclosed. Applicants' method provides an operating system comprising a privileged execution mode and a non-privileged execution mode, and a plurality of user mode strings operating in the non-privileged execution mode. The computing device receives a request from a first user mode string to operate in the privileged execution mode to perform one or more designated tasks. Applicants' method authorizes the first user mode string to operate in the privileged execution mode, and the first user mode string performs those one or more designated tasks using the privileged execution mode. Applicants' method continues to permit the first user mode string to operate in the privileged execution mode after completion of the one or more designated tasks.

32 Claims, 3 Drawing Sheets

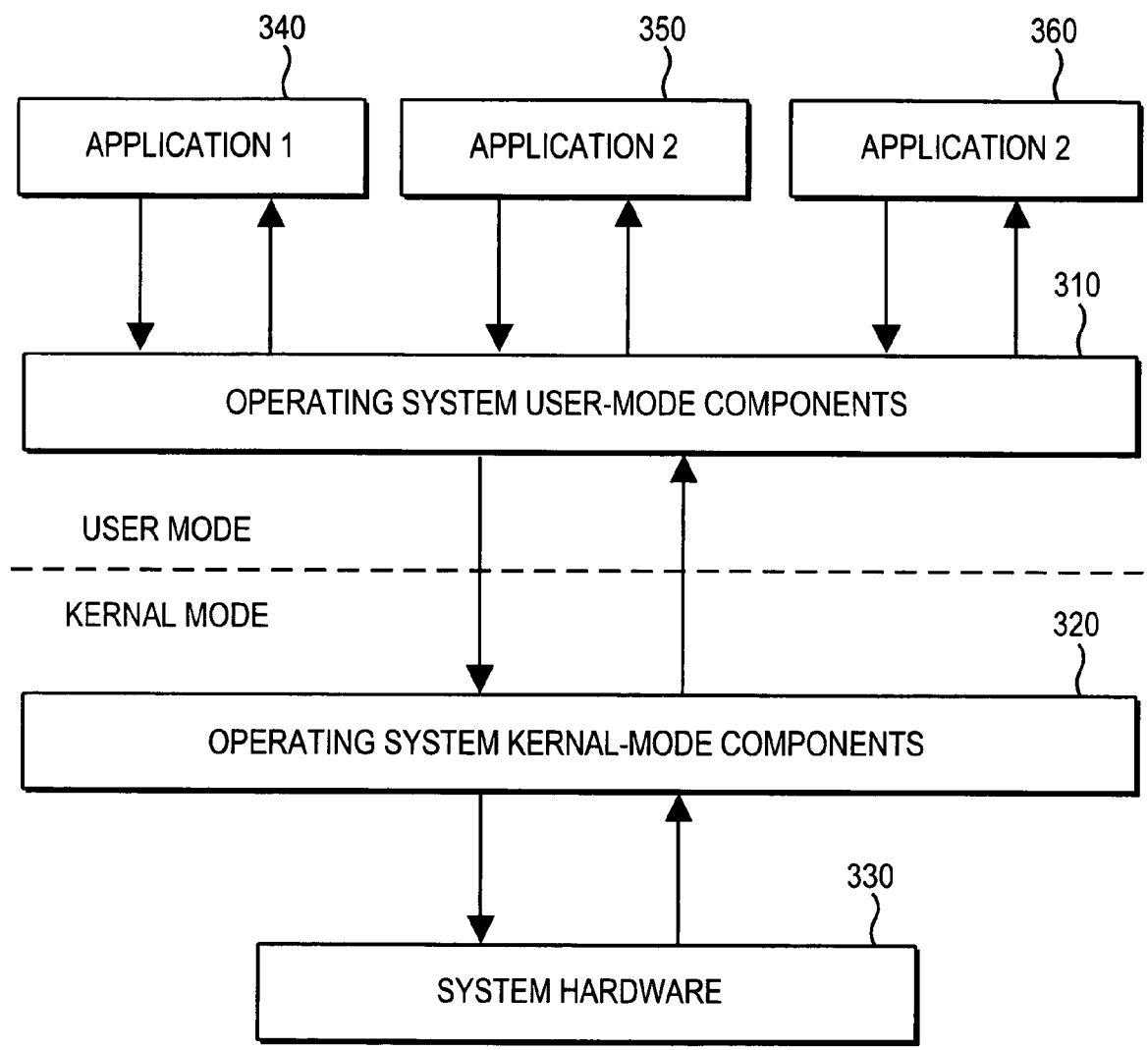

METHOD TO ENABLE USER MODE PROCESS TO OPERATE IN A PRIVILEGED EXECUTION MODE

FIELD OF THE INVENTION

This invention relates to a method to enable a user mode string, i.e. a user mode process, to operate in a privileged execution mode.

BACKGROUND OF THE INVENTION

It is common for a computer processor and associated operating system to have two different levels of resources and protection. One level, referred to as a non-privileged mode or user mode, is used by various operating system components, application programs, and other so-called "user" processes or programs. At this level, an execution thread is prevented by the operating system and by the computer processor from performing certain security-critical operations. The thread is also prevented from directly accessing many system resources. The purpose of the non-privileged execution mode is to isolate a user process as much as possible so that it cannot interfere with other user processes or with operating system functions.

User-mode drivers run in the nonprivileged processor mode in which other application code, including protected subsystem code, executes. User-mode drivers cannot gain access to system data except by making a syscall which, in turn, calls system services. While a user process may itself crash, it should not be able to crash other programs or the operating system.

The other level of execution is referred to as privileged mode, system mode, or kernel mode. Critical operating system components are implemented in kernel mode. Kernel-mode components are responsible for things like virtual memory management, responding to interrupts and exceptions, scheduling execution threads, synchronizing the activities of multiple processors, and other critical or sensitive functions. Such components, which execute from system mode, are generally referred to collectively as "the kernel."

Kernel-mode drivers run as part of the operating system's executive, the underlying operating system component that supports one or more protected subsystems. User-mode and kernel-mode drivers have different structures, different entry points, and different system interfaces. Whether a device requires a user-mode or kernel-mode driver depends on the type of device and the support already provided for it in the operating system. Some device drivers can run wholly or partially in user mode. User-mode drivers have unlimited stack space, access to one or more APIs, and easier debugging.

Most device drivers run in kernel mode. Kernel-mode drivers can perform certain protected operations and can access system structures that user-mode drivers cannot access. The increased access comes at the price, however, of more difficult debugging and a greater chance of system corruption. When code runs in the privileged kernel-mode environment, the operating system, by design, performs fewer checks on data integrity and the validity of requests.

SUMMARY OF THE INVENTION

Applicants' invention includes a method to enable a user mode process to operate in a privileged execution mode. Applicants' method provides a computing device, an operating system comprising a privileged execution mode and a non-privileged execution mode, and a plurality of user mode strings operating in the non-privileged execution mode.

The computing device receives a request from a first user mode string to operate in the privileged execution mode to perform one or more designated tasks. Applicants' method authorizes the first user mode string to operate in the privileged execution mode, and the first user mode string performs those one or more designated tasks using the privileged execution mode. Applicants' method continues to permit the first user mode string to operate in the privileged execution mode after completion of the one or more designated tasks.

BRIEF DESCRIPTION OF THE DRAWINGS

The invention will be better understood from a reading of the following detailed description taken in conjunction with the drawings in which like reference designators are used to designate like elements, and in which:

FIG. 3 is a block diagram showing the relationship between user mode operating system components and kernel mode operating system components.

DETAILED DESCRIPTION OF THE PREFERRED EMBODIMENTS

Referring to the illustrations, like numerals correspond to like parts depicted in the Figures. The invention will be described as embodied in an information storage and retrieval system comprising two or more clusters, where each of those clusters includes one or more processors, one or more data caches, and one or more non-volatile storage devices. The following description of Applicant's method is not meant, however, to limit Applicant's invention to data processing systems in general, or to data processing system which include a plurality of clusters, as the invention herein can be applied to authorizing a string disposed in an operating system disposed in a computing device to operate in a privileged execution mode.

Figure 1:
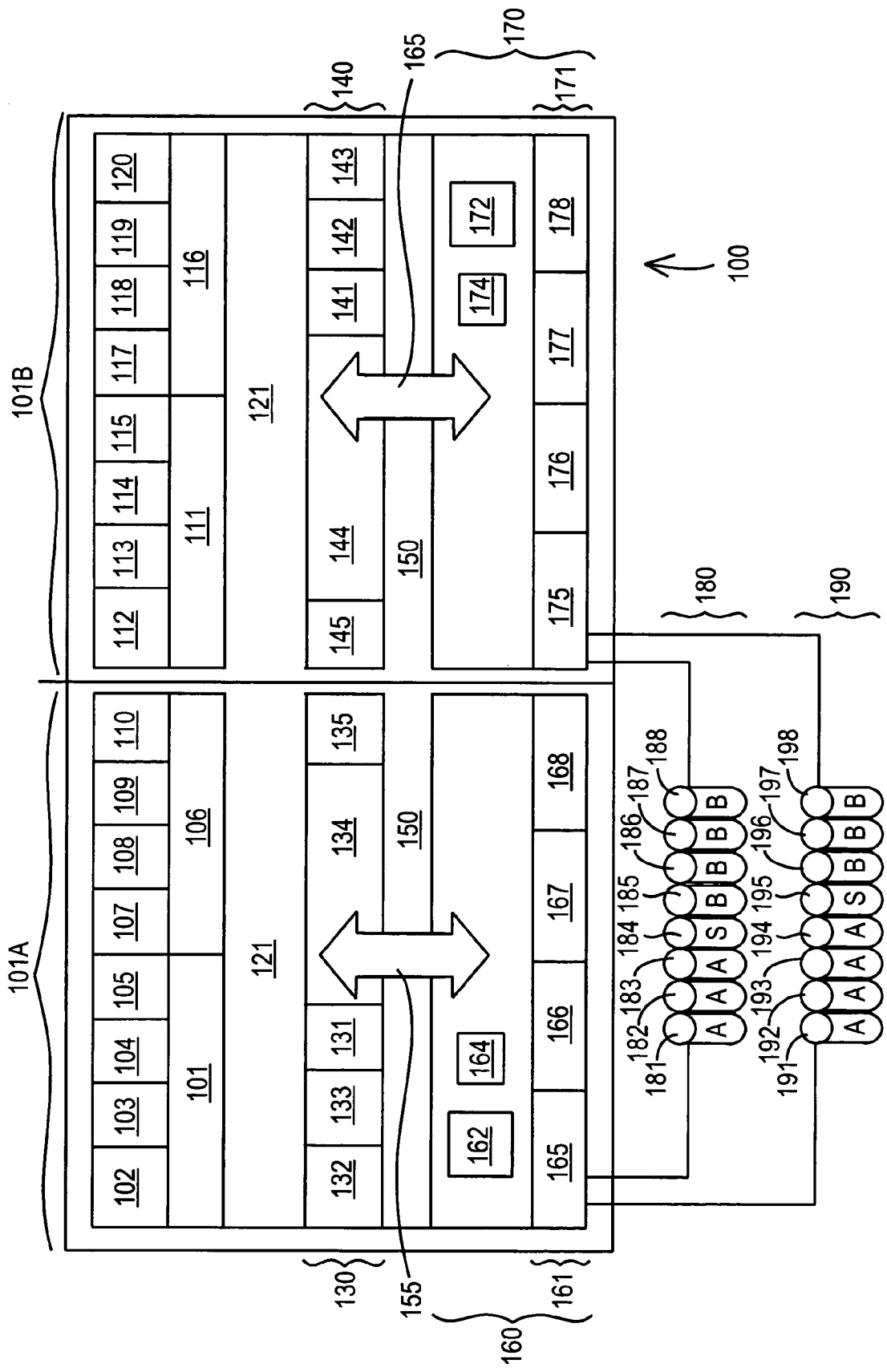
FIG. 1 is a block diagram showing one embodiment of Applicants' information storage and retrieval system.

In the illustrated embodiment of FIG. 1, Applicants' information storage and retrieval system 100 includes a first cluster 101A and a second cluster 101B. Each cluster includes a processor portion 130/140 and an input/output portion 160/170, respectively. Internal PCI buses in each cluster are connected via a Remote I/O bridge 155/165 between the processor portions 130/140 and device I/O portions 160/170, respectively.

Information storage and retrieval system 100 further includes a plurality of host adapters 102-105, 107-110, 112-115, and 117-120, disposed in four host bays 101, 106, 111, and 116. Each host adapter may comprise one or more Fibre Channel ports, one or more FICON ports, one or more ESCON ports, or one or more SCSI ports. Each host adapter is connected to both clusters through one or more Common Platform Interconnect bus 121 such that each cluster can handle I/O from any host adapter.

Processor portion 130 includes microcode 131, processor 132, cache 134, and an operating system 135. In certain embodiments, processor portion 130 further includes memory 133. In certain embodiments, memory device 133 comprises random access memory. In certain embodiments, memory device 133 comprises non-volatile memory.

Processor portion 140 includes microcode 141, processor 142, cache 144, and an operating system 145. In certain embodiments, processor portion 140 further includes memory 143. In certain embodiments, memory device 143 comprises random access memory. In certain embodiments, memory device 143 comprises non-volatile memory.

I/O portion 160 includes non-volatile storage ("NVS") 162 and NVS batteries 164. I/O portion 170 includes NVS 172 and NVS batteries 174.

I/O portion 160 further comprises a plurality of device adapters, such as device adapters 165, 166, 167, and 168, and sixteen disk drives organized into two arrays, namely array "A" and array "B". The illustrated embodiment of FIG. 1 shows two disk arrays. In other embodiments, Applicants' information storage and retrieval system includes more than two hard disk arrays. Each array of drives appears to a host computer as one or more logical drives.

In certain embodiments, arrays "A" and "B" utilize a RAID protocol. In certain embodiments, arrays "A" and "B" comprise what is sometimes called a JBOD array, i.e. "Just a Bunch Of Disks" where the array is not configured according to RAID. As those skilled in the art will appreciate, a RAID (Redundant Array of Independent Disks) rank comprises independent disk drives configured in an array of disk drives to obtain performance, capacity and reliability that exceeds that of a single large drive.

In the illustrated embodiment of FIG. 1, disk array "A" includes disk drives 181, 182, 183, 191, 192, 193, and 194. Disk array "B" includes disk drives 185, 186, 187, 188, 196, 197, and 198.

In order for the information storage and retrieval system's microcode, such as for example microcode 131 (FIG. 1), to access hardware and directly manage data structures and cache, privileged execution mode access is required while that microcode is executing. To compile the system's microcode as a user-mode binary application running under Linux, Applicant's have modified the PowerPC branch of the Linux kernel to allow a user-mode application with root permissions (UID 0) to execute with the processor, such as processor 132 (FIG. 1), in privileged execution mode.

Figure 2:
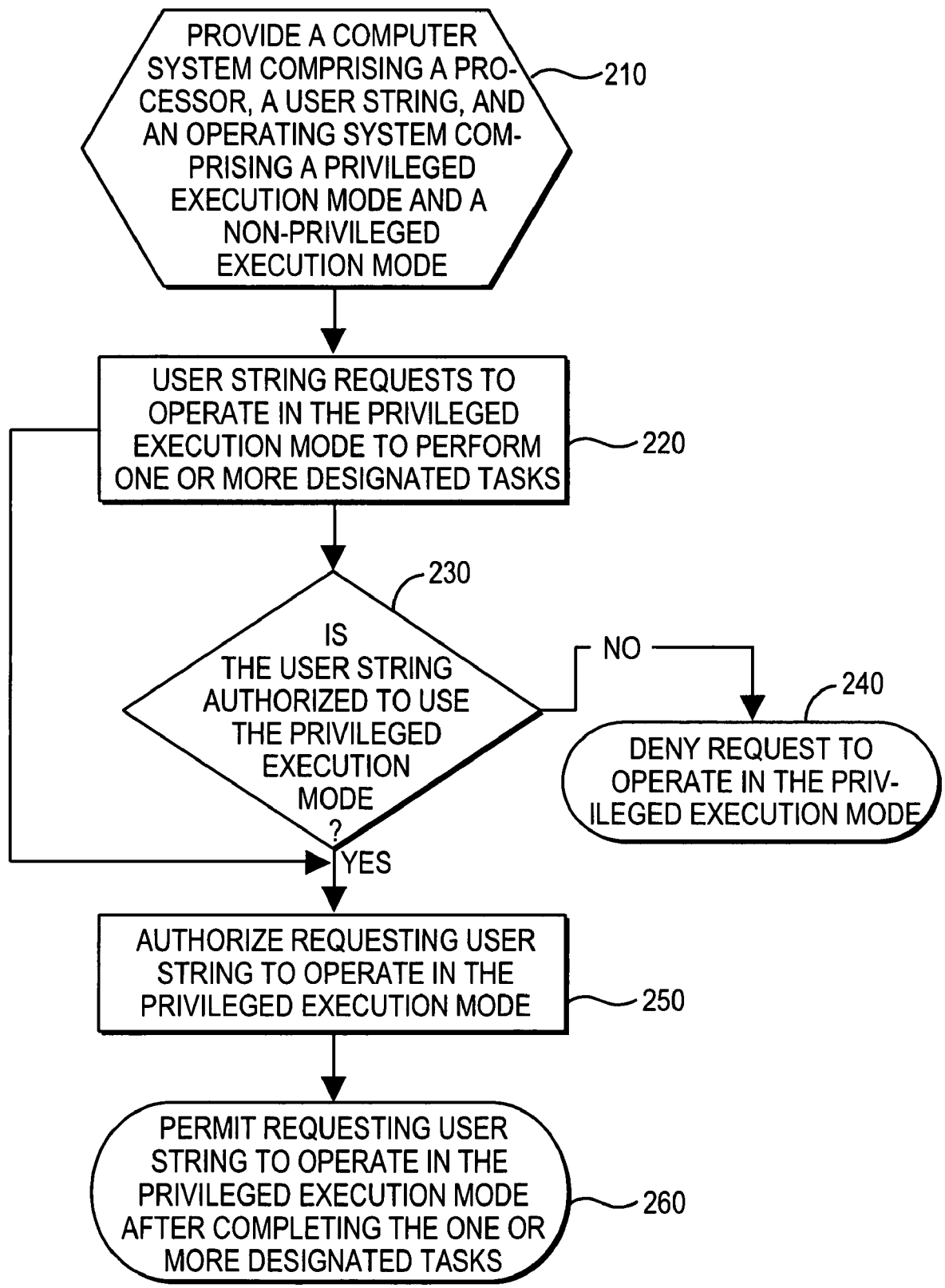
FIG. 2 is a flow chart summarizing the steps of Applicants' method.

Referring now to FIG. 2, in step 210 Applicants' method provides a computing device comprising a processor, a plurality of user strings, and an operating system comprising a privileged execution mode and a non-privileged execution mode. In certain embodiments, the computing device of step 210 comprises an information storage and retrieval system, such as for example system 100.

In step 220, one of the plurality of user strings, i.e. a first user mode string, requests to operate in the privileged execution mode to performed one or more designated tasks. For example, a user string may request to operate in the privileged execution mode to execute microcode with system interrupts disabled. In certain embodiments, the request of step 220 comprises a request to allow the requesting user string to operate in a "priv_usermode," i.e. in the privileged execution mode.

In certain embodiments, the request of step 220 is activated through an overrided syscall. In other embodiments, Applicants' "priv_usermode" mechanism is activated through a device driver interface. In certain embodiments, a process with root-level access can set/query the "user_privmode" status via a proc file, such as for example "/proc/user_priv-mode."

In certain embodiments, Applicants' method transitions from step 220 to step 250. In other embodiments, Applicants' method transitions from step 220 to step 230 wherein Applicants' method determines if the requesting string is authorized to use the privileged execution mode. In certain embodiments, the system's microcode, such as for example microcode 131 includes a look-up table which indicates which user mode strings are authorized to operate in the privileged execution mode. In certain embodiments, a user mode string authorized to operate in the privileged execution mode includes a flag so indicating.

If Applicants' method determines in step 230 that the requesting string does is not permitted to operate in the privileged execution mode, then the method transitions from step 230 to step 240 wherein the method denies the request of step 220 to operate in the privileged execution mode. Alternatively, if Applicants' method determines in step 230 that the requesting string does is permitted to operate in the privileged execution mode, then the method transitions from step 230 to step 250 wherein the method authorizes the requesting string to operate in the privileged execution mode.

In certain embodiments, the requesting user string activates the user_privmode mechanism using an 'echo"1"./proc/user_privmode' function. Upon handling the write to the proc file, the user_privmode kernel module modifies a flag located in the processestask_struct. This flag is initially set to 0 to indicate that the user_privmode mechanism is not activated. Invoking the function "current-is_priv_user" sets the flag to 1. After setting this flag to 1, the flag can be checked by the kernel exception code that returns to the user state. In certain embodiments, after setting this flag to 1, the flag can be checked by the kernel exception/ret_to_user code for setting the supervisor bit.

In step 260, Applicants' method continues to allow the requesting string of step 220 to operate in the privileged execution mode even after that requesting string has completed the one or more designated tasks of step 220. In certain embodiments, the authorization to operate in the privileged execution mode is not withdrawn from the requesting string until the computing device, such as information storage and retrieval system 100, is shut down.

In certain embodiments of Applicants' apparatus and method, Applicants' computing device, such as for example system 100, utilizes an operating system, such as for example operating system 135 (FIG. 1) and/or 145 (FIG. 1). In certain embodiments, that operating system comprises a modification of Linux. As those skilled in the art will appreciate, Linux is a free Unix-type operating system originally created by Linus Torvalds with the assistance of developers around the world. Developed under the GNU General Public License, the source code for Linux is freely available.

As those skilled in the art will further appreciate and referring now to FIG. 3, Linux includes a plurality of operating system components operating in a non-privileged execution mode, including components 310. Operating system user mode components 310 include for example various user mode strings. The operating system user mode components 310 interface with a plurality of applications, such as for example Application 340, Application 350, Application 360, and the like.

The plurality of operating system components operating in the non-privileged execution mode, including user mode strings, communicate with a plurality of operating system components 320 operating in the privileged execution mode, including kernel mode strings. Kernel mode operating system components 320 communicate with, inter alia, one or more system hardware devices 330. As those skilled in the art will appreciate, the plurality of operating system kernel-mode components 320 are sometimes referred to collectively as the "kernel."

The PowerPC linux kernel uses the MSP_PR bit of the MSR register to determine if the interrupted process was executing in the kernel or user mode space. Thus, if a user mode process executes with MSP_PR on, the kernel might incorrectly assume the code is actually in the kernel. To avoid this problem, Applicants' user_privmode code executes upon entry into the kernel and will execute when the kernel code returns to user space. At these points, the extra variables hidden in the task_struct are checked, and if necessary, the MSR_PR bit is removed from SRR1, i.e. the user context MSR, before any kernel code checks to see if the code that was executing comprises user code or kernel code. The extra variables are added to the task_struct and stored at the end of the 8 KB kernel stack.

Table 1 recites certain modifications that Applicants' operating system includes at linux/sched.h.

TABLE 1

| | |
|---|---|
| u32 is_priv_user | /* Is this process allowed to be priv_user */ |
| u32 priv_user_mode | /* Is this process currently priv_user */ |
| | /* priv_user = user mode code running with supervisor mode on */ |

The code that executes upon any entry into the Linux kernel is placed in a macro that is included before every PowerPC exception, EXCEPTION_PROLOG. Table 2 recites certain modifications that Applicants' operating system includes at linux/arc/ppc/kernel/head.S.

TABLE 2

| | |
|---|---|
| mfspr r21, SPRG3; | /* Grab phys addr of task_struct */ |
| lwz r20 IS_PRIV_USER_OFFSET(r21); | |
| cmpwi 0, r20, 0; | |
| beq 1f; | /* Skip if priv_user_mode wasn't on */ |
| mfspr SRR1, r20; | |
| andi r20, r20 (~MSR_PR); | /* Remove MSR_PR bit from interrupted processes MSR */ |
| mtspr SRR1, r20 | |
| 1: | |

Table 3 recites modifications to linux/arch/ppc/kernel/entry/S, where that code that executes upon return from the Linux kernel exception handler to user mode.

TABLE 3

| | |
|---|---|
| mfspr r21, SPRG3 | /* Grab phys addr of task_struct */ |
| lwz r20, IS_PRIV_USER_OFFSET(r21) | |
| cmpwi 0, r20, 0 | |
| beq 1f | /* Skip if priv_user_mode wasn't on */ |
| mfspr SRR1, r20 | |
| ori r20, r20 MSR_PR | /* Turn on MSR_PR in user-processes so it has privilege */ |
| li r20, 1 | |
| stw r20, IS_PRIV_MODE_OFFSET(r21) | /* Mark that this process is user mode with priv */ |
| mtspr SPR1, r20 | |
| 1: | |

In certain embodiments, individual steps recited in FIG. 2 may be combined, eliminated, or reordered.

In certain embodiments, Applicants' invention includes instructions residing in memory 133 (FIG. 1), where those instructions are executed by processor 132 (FIG. 1) to performs steps 220, 230, 240, 250, and 260, recited in FIG. 2, wherein step 220 comprises receiving a request from a user mode string. In other embodiments, Applicants' invention includes instructions residing in any other computer program product, where those instructions are executed by a computer external to, or internal to, system 100, to perform steps 220, 230, 240, 250, and 260, recited in FIG. 2, wherein step 220 comprises receiving a request from a user mode string. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a computing device comprising a processor, a method to enable a user mode process to operate in a privileged execution mode, comprising the steps of:
    providing an operating system comprising a kernel portion and a privileged execution mode permitting access to said kernel portion and a non-privileged execution mode which does not permit access to said kernel portion;
    providing a plurality of user mode strings operating in the non-privileged execution mode;
    requesting by a first user mode string to operate in the privileged execution mode to perform one or more designated tasks;
    authorizing said first user mode string to operate in the privileged execution mode;
    performing by said first user mode string said one or more designated tasks using said privileged execution mode;
    permitting said first user mode string to operate in said privileged execution mode after completion of said one or more designated tasks;
    wherein said requesting step, said authorizing step, and said performing step, do not include accessing said kernel via a system call.

2. The method of claim 1, wherein said requesting step further comprises requesting by said first user mode string during start-up of said data storage and retrieval system to operate in the privileged execution mode.

3. The method of claim 2, further comprising the step of withdrawing the authorization for said requesting string to operate in said privileged execution mode upon shut down of said computing device.

4. The method of claim 2, further comprising the steps of:
    disabling system interrupts by said first user mode string after receiving authorization to operate in said privileged execution mode;
    performing said one or more designated tasks;
    enabling system interrupts by said first user mode string after completing said one or more designated tasks.

5. The method of claim 1, wherein said operating system comprises Linux.

6. The method of claim 5, wherein said requesting step further comprises executing the function:
    echo "1">/proc/user_privmode.

7. The method of claim 6, wherein said providing an operating system step further comprises the steps of providing an operating system which includes a variable processestask_struct comprising a flag, said method further comprising the step of setting said flag to "1".

8. The method of claim 7, wherein said operating system includes the following code at linux/sched.h:

```
u32 is_priv_user; and
u32 priv_user_mode.
```

9. The method of claim 8, wherein said operating system includes the following code at linux/arc/ppc/kernel/head.S:

```
mfspr r21, SPRG3;
lwz r20, IS_PRIV_USER_OFFSET(r21);
cmpwi 0, r20, 0;
beq 1f;
mfspr SRR1, r20;
andi r20, r20 (~MSR_PR);
mtspr SRR1, r20;
1:.
```

10. The method of claim 9, wherein said operating system includes the following code at linux/arch/ppc/kernel/head.S:

```
mfspr r21, SPRG3;
lwz r20, IS_PRIV_USER_OFFSET(r21);
cmpwi 0, r20, 0
beq 1f;
mfspr SRR1, r20;
ori r20, r20 MSR_PR;
li r20, 1;
stw r20, IS_PRIV_MODE_OFFSET(r21);
mtspr SRR1, r20;
1:.
```

11. The method of claim 10, wherein said computing device comprises an information storage and retrieval system.

12. The method of claim 11, wherein said information storage and retrieval system comprises one or more host adapters, a data cache, one or more storage device adapters, and a plurality of information storage media.

13. An article of manufacture comprising a processor, an operating system comprising a kernel portion and a privileged execution mode permitting access to said kernel portion and a non-privileged execution mode which does not permit access to said kernel portion, a plurality of user mode strings operating in the non-privileged execution mode and a computer useable medium having computer readable program code disposed therein to enable a user mode process to operate in a privileged execution mode, the computer readable program code comprising a series of computer readable program steps to effect:

receiving a request from a first user mode string to operate in the privileged execution mode to perform one or more designated tasks;
determining if said first user mode string is authorized to operate in the privileged execution mode;
operative if said first user mode string is authorized to operate in the privileged execution mode, authorizing said first user mode string to operate in the privileged execution mode;
permitting said first user mode string to operate in said privileged execution mode after completion of said one or more designated tasks
wherein said requesting step, said authorizing step, and said performing step, do not include accessing said kernel via a system call.

14. The article of manufacture of claim 13, wherein said computer readable program code comprising a series of computer readable program steps to effect receiving said request further comprises computer readable program code comprising a series of computer readable program steps to effect receiving said request to operate in the privileged execution mode during start-up of said data storage and retrieval system.

15. The article of manufacture of claim 14, said computer readable program code further comprising a series of computer readable program steps to effect withdrawing the authorization for said requesting string to operate in said privileged execution mode upon shut down of said information storage and retrieval system.

16. The article of manufacture of claim 14, said computer readable program code further comprising a series of computer readable program steps to effect:

disabling system interrupts by said first user mode string after receiving authorization to operate in said privileged execution mode;
performing said one or more designated tasks;
enabling system interrupts by said first user mode string after completing said one or more designated tasks.

17. The article of manufacture of claim 13, wherein said operating system comprises Linux.

18. The article of manufacture of claim 17, said computer readable program code further comprising a series of computer readable program steps to effect executing the function:
echo "1">/proc/user_privmode.

19. The article of manufacture of claim 18, wherein said operating system comprises a variable processestask_struct comprising a flag, said computer readable program code further comprising a series of computer readable program steps to effect setting said flag to "1".

20. The article of manufacture of claim 19, wherein said operating system includes the following code at linux/sched.h:

```
u32 is_priv_user; and
u32 priv_user_mode.
```

21. The article of manufacture of claim 20, wherein said operating system includes the following code at linux/arc/ppc/kernel/head.S:

```
mfspr r21, SPRG3;
lwz r20, IS_PRIV_USER_OFFSET(r21);
cmpwi 0, r20, 0;
beq 1f;
mfspr SRR1, r20;
andi r20, r20 (~MSR_PR);
mtspr SRR1, r20;
1:.
```

22. The article of manufacture of claim 21, wherein said operating system includes the following code at linux/arch/ppc/kernel/head.S:

```
mfspr r21, SPRG3;
lwz r20, IS_PRIV_USER_OFFSET(r21);
cmpwi 0, r20, 0
beq 1f;
mfspr SRR1, r20;
ori r20, r20 MSR_PR;
li r20, 1;
```

-continued

```
stw r20, IS_PRIV_MODE_OFFSET(r21);
mtspr SRR1, r20;
1:.
```

23. A computer program product encoded in an information storage medium and usable with a programmable computer processor having computer readable program code embodied therein to enable a user mode string to operate in a privileged execution mode, wherein a plurality of user mode strings are disposed in microcode disposed in an information storage and retrieval system comprising a processor, an operating system comprising a privileged execution mode permitting access to said kernel portion and a non-privileged execution mode which does not permit access to said kernel portion, comprising:
   computer readable program code which causes said programmable computer processor to receive a request from a first user mode string to operate in the privileged execution mode to perform one or more designated tasks;
   computer readable program code causes said programmable computer processor to authorize said first user mode string to operate in the privileged execution mode;
   computer readable program code which causes said programmable computer processor to permit said first user mode string to operate in said privileged execution mode after completion of said one or more designated tasks
   wherein the computer readable program code which causes said processor to receive said request from said first user mode string and to authorize said first user mode string to operate in the privileged execution mode does not include making a system call to access said kernel.

24. The computer program product of claim 23, wherein said computer readable program code causes said processor to receive said request further comprises computer readable program code which causes said processor to receive said request to operate in the privileged execution mode during start-up of said data storage and retrieval system.

25. The computer program product of claim 24, further comprising computer readable program code which causes said programmable computer processor to withdraw the authorization for said requesting string to operate in said privileged execution mode upon shut down of said information storage and retrieval system.

26. The computer program product of claim 24, further comprising:
   computer readable program code which causes said programmable computer processor to receive from said first user mode string one or more commands to disable system interrupts;
   computer readable program code which causes said programmable computer processor to receive from said first user mode string one or more commands to enable system interrupts after said first user mode string completes said one or more designated tasks.

27. The computer program product of claim 23, wherein said operating system comprises Linux.

28. The computer program product of claim 27, further comprising computer readable program code which causes said programmable computer processor to execute the function:
   echo "1">/proc/user_privmode.

29. The computer program product of claim 28, wherein said operating system comprises a variable processestask_struct comprising a flag, further comprising computer readable program code which causes said programmable computer processor to set said flag to "1".

30. The computer program product of claim 29, wherein said operating system includes the following code at linux/sched.h:

```
u32 is_priv_user; and
u32 priv_user_mode.
```

31. The computer program product of claim 30, wherein said operating system includes the following code at linux/arc/ppc/kernel/head.S:

```
mfspr r21, SPRG3;
lwz r20, IS_PRIV_USER_OFFSET(r21);
cmpwi 0, r20, 0;
beq 1f;
mfspr SRR1, r20;
andi r20, r20 (~MSR_PR);
mtspr SRR1, r20;
1:.
```

32. The computer program product of claim 31, wherein said operating system includes the following code at linux/arch/ppc/kernel/head.S:

```
mfspr r21, SPRG3;
lwz r20, IS_PRIV_USER_OFFSET(r21);
cmpwi 0, r20, 0
beq 1f;
mfspr SRR1, r20;
ori r20, r20 MSR_PR;
li r20, 1;
stw r20, IS_PRIV_MODE_OFFSET(r21);
mtspr SRR1, r20;
1:.
```

* * * * *

UNITED STATES PATENT AND TRADEMARK OFFICE
CERTIFICATE OF CORRECTION

| | |
|---|---|
| PATENT NO. | : 7,669,050 B2 |
| APPLICATION NO. | : 10/877910 |
| DATED | : February 23, 2010 |
| INVENTOR(S) | : Blinick et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1639 days.

Signed and Sealed this

Seventh Day of December, 2010

David J. Kappos
*Director of the United States Patent and Trademark Office*